United States Patent
Kim et al.

(10) Patent No.: US 11,427,669 B2
(45) Date of Patent: Aug. 30, 2022

(54) PHOTOCURABLE RESIN COMPOSITION AND FABRICATION METHOD OF WINDOW MEMBER USING THE SAME

(71) Applicants: Samsung Display Co., Ltd., Yongin-si (KR); KCC Corporation, Seoul (KR)

(72) Inventors: Dongho Kim, Hwaseong-si (KR); Daehwan Kim, Yongin-si (KR); Jungho Ahn, Hwaseong-si (KR); Soyeon Lee, Uijeongbu-si (KR)

(73) Assignees: SAMSUNG DISPLAY CO., LTD.; KCC CORPORATION

( * ) Notice: Subject to any disclaimer, the term of this patent is extended or adjusted under 35 U.S.C. 154(b) by 35 days.

(21) Appl. No.: 16/211,627

(22) Filed: Dec. 6, 2018

(65) Prior Publication Data

US 2019/0177459 A1  Jun. 13, 2019

(30) Foreign Application Priority Data

Dec. 7, 2017 (KR) .................. 10-2017-0167222

(51) Int. Cl.

| | |
|---|---|
| *C08F 265/06* | (2006.01) |
| *C08F 283/01* | (2006.01) |
| *C09D 4/06* | (2006.01) |
| *C08F 2/48* | (2006.01) |
| *C08L 33/10* | (2006.01) |
| *C08L 33/14* | (2006.01) |
| *C08K 5/07* | (2006.01) |
| *C08K 5/53* | (2006.01) |
| *C08J 5/18* | (2006.01) |
| *B32B 27/30* | (2006.01) |
| *B32B 7/12* | (2006.01) |
| *C09J 4/06* | (2006.01) |
| *C08F 20/28* | (2006.01) |
| *C08F 20/36* | (2006.01) |
| *C08F 220/18* | (2006.01) |
| *C08F 220/28* | (2006.01) |

(52) U.S. Cl.
CPC .............. *C08F 265/06* (2013.01); *B32B 7/12* (2013.01); *B32B 27/308* (2013.01); *C08F 2/48* (2013.01); *C08F 283/01* (2013.01); *C08J 5/18* (2013.01); *C08K 5/07* (2013.01); *C08K 5/53* (2013.01); *C08L 33/10* (2013.01); *C08L 33/14* (2013.01); *C09D 4/06* (2013.01); *C09J 4/06* (2013.01); *B32B 2255/26* (2013.01); *B32B 2305/72* (2013.01); *B32B 2310/0831* (2013.01); *B32B 2457/20* (2013.01); *C08F 20/28* (2013.01); *C08F 20/36* (2013.01); *C08F 220/1811* (2020.02); *C08F 220/281* (2020.02)

(58) Field of Classification Search
CPC .. B32B 7/12; B32B 27/308; C08J 5/07; C08J 5/53; C08J 5/18; C08L 33/10; C08L 33/14; C09D 4/04; C09J 4/06; C08F 2/48
See application file for complete search history.

(56) References Cited

U.S. PATENT DOCUMENTS

| | | |
|---|---|---|
| 6,974,784 B1 | 12/2005 | Nonaka et al. |
| 8,697,240 B2 | 4/2014 | Ogawa et al. |
| 9,012,028 B2 | 4/2015 | Takahashi et al. |
| 10,167,359 B2 | 1/2019 | Maurin et al. |
| 2001/0008691 A1 | 7/2001 | Isogai et al. |
| 2008/0306455 A1 | 12/2008 | Dias et al. |
| 2011/0159285 A1 | 6/2011 | Choi et al. |
| 2011/0201718 A1 | 8/2011 | Naitou et al. |
| 2012/0114953 A1 | 5/2012 | Ogawa et al. |
| 2012/0329899 A1 | 12/2012 | Kawabe et al. |
| 2015/0049287 A1 | 2/2015 | Chang et al. |
| 2016/0091791 A1 | 3/2016 | Iwata et al. |

FOREIGN PATENT DOCUMENTS

| | | |
|---|---|---|
| CN | 102186924 A | 9/2011 |
| CN | 102203862 A | 9/2011 |
| CN | 102268122 A | 12/2011 |
| CN | 102471426 A | 5/2012 |
| CN | 102203862 B | 10/2013 |
| CN | 104151890 A | 11/2014 |
| CN | 105238280 A | 1/2016 |
| CN | 105378020 A | 3/2016 |
| CN | 106029702 A | 10/2016 |
| CN | 107001856 A | 8/2017 |
| JP | 5032249 B2 | 9/2012 |
| JP | 2014-162852 A | 9/2014 |
| JP | 6037627 B2 | 12/2016 |
| JP | 2017-48358 A | 3/2017 |

(Continued)

OTHER PUBLICATIONS

Tokita et al., machine English translation of JP 2014-162852 (Year: 2014).*

(Continued)

*Primary Examiner* — Jessica M Roswell
(74) *Attorney, Agent, or Firm* — Innovation Counsel LLP

(57) ABSTRACT

Provided are a photocurable resin composition and fabrication method of window member using the same. The photocurable resin composition includes a (meth)acrylic resin, a urethane acrylate oligomer, a photopolymerizable monomer and a photopolymerization initiator. Accordingly, deterioration in physical properties such as cracking or decrease of adhesion under additional ultraviolet irradiation conditions, high temperature and high humidity conditions, and thermal shock conditions does not occur.

3 Claims, 9 Drawing Sheets

(56) References Cited

FOREIGN PATENT DOCUMENTS

| | | |
|---|---|---|
| JP | 2017-165807 A | 9/2017 |
| KR | 10-2012-0040225 A | 4/2012 |
| KR | 10-2013-0066083 A | 6/2013 |
| KR | 10-2015-0019502 A | 2/2015 |
| KR | 10-2016-0016820 A | 2/2016 |
| KR | 10-2016-0094103 A | 8/2016 |

OTHER PUBLICATIONS

Chinese Communication corresponding to Chinese Patent Application No. 201811492886.0 dated Feb. 5, 2021 7 pages.

* cited by examiner

PHOTOCURABLE RESIN COMPOSITION AND FABRICATION METHOD OF WINDOW MEMBER USING THE SAME

CROSS-REFERENCE TO RELATED APPLICATIONS

This application claims priority under 35 U.S.C. § 119 of Korean Patent Application No. 10-2017-0167222, filed on Dec. 7, 2017, the entire content of which is hereby incorporated by reference.

BACKGROUND

The present disclosure herein relates to a photocurable resin composition and a fabrication method of a window member using the same.

A window member for protecting a screen is installed on a front surface of a display panel such as a liquid crystal display panel, a plasma display panel, an organic light emitting display panel, and the like. Specifically, the window member is attached and fixed to the outer surface of the display panel such that the user may identify user's input or the output of the device from the outside.

The window member is formed on the outer surface of the device and directly affects the design of the device. Accordingly, an attempt is being tried such that not only a function for protecting the display panel, but also various designs are added to the window member.

As a method for adding a design to a window member, a method which laminates a layer of imparting an optical function through an ultraviolet curable molding layer and a decoration film applying a deposition film through an inorganic material or a metal to the window is being applied.

SUMMARY

The present disclosure provides a photocurable resin composition capable of forming a resin layer which has an improved adhesive property and weatherability and which does not have deterioration of properties under conditions of high temperature and high humidity, and thermal shock.

The present disclosure also provides a fabrication method of a window member that does not have deterioration in physical properties such as cracking or decrease of adhesion under: an additional UV irradiation condition capable of occurring in an additional process; at high temperature and high humidity condition; and at a thermal shock condition.

An embodiment of the present disclosure provides a photocurable resin composition, including: based on 100 parts by weight of a (meth)acrylic resin, about 10 to about 50 parts by weight of a urethane acrylate oligomer; about 400 to about 600 parts by weight of a photopolymerizable monomer; and about 20 to about 40 parts by weight of a photopolymerization initiator.

In an embodiment, the (meth)acrylic resin may have a weight average molecular weight of about 10,000 to about 70,000, and may have a glass transition temperature of about 50° C. to about 90° C.

In an embodiment, the photopolymerizable monomer may include a monofunctional (meth)acrylic monomer, a bifunctional (meth)acrylic monomer, and a polyfunctional (meth)acrylic monomer. The monofunctional (meth)acrylic monomer, the bifunctional (meth)acrylic monomer, and the polyfunctional (meth)acrylic monomer may be mixed in a weight ratio of about 1:about 0.5 to about 1.5:about 0.2 to about 1.

In an embodiment, the photopolymerizable monomer may include at least one selected from the group consisting of isoboryl acrylate (IBOA), tetrahydrofuryl acrylate, tetrahydrofurfuryl acrylate, acryloyl morpholine, 2-phenoxyethyl acrylate, tripropyleneglycol diacrylate, polyethyleneglycol diacrylate, 1,6-hexane diol diacrylate, trimethylolpropane triacrylate, pentaerythritol triacrylate, or dipentaerytritol hexaacrylate.

In an embodiment, the photocurable resin composition may form a pattern layer of a window member included in a display device.

An embodiment of the present disclosure provides a fabrication method of a window member, the method including: preparing a light transmissive film including a transmissive area through which light is capable of being transmitted, and a bezel area surrounding the transmissive area. A photocurable resin composition is applied on one surface of the light transmissive film and the photocurable resin composition is cured to form a molding layer. A cover member is attached on an other surface of the light transmissive film. The photocurable resin composition may include, based on 100 parts by weight of a (meth)acrylic resin, about 10 to about 50 parts by weight of a urethane acrylate oligomer; about 400 to about 600 parts by weight of a photo polymerizable monomer; and about 20 to about 40 parts by weight of a photopolymerization initiator.

The above method may further include: after the forming the molding layer, depositing an organic material or an inorganic material on the molding layer so as to overlap the bezel area on a plane to form a deposition layer; and forming a light blocking layer on the deposition layer. In addition, the above method may further include: forming an adhesive layer on the molding layer.

In an embodiment, the adhesive layer may include an optically clear adhesive film or an optical clear resin.

In an embodiment, the adhesive layer may be formed so as to cover the deposition layer and the light blocking layer.

In an embodiment, a pattern may be defined on one surface of the molding layer that is in contact with the deposition layer, and the pattern overlaps the bezel area on a plane.

In an embodiment, in the forming the molding layer, the photocurable resin composition may be ultraviolet cured.

In an embodiment, the photopolymerizable monomer may include a monofunctional (meth)acrylic monomer, a bifunctional (meth)acrylic monomer, and a polyfunctional (meth) acrylic monomer.

BRIEF DESCRIPTION OF THE FIGURES

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Figure 1:
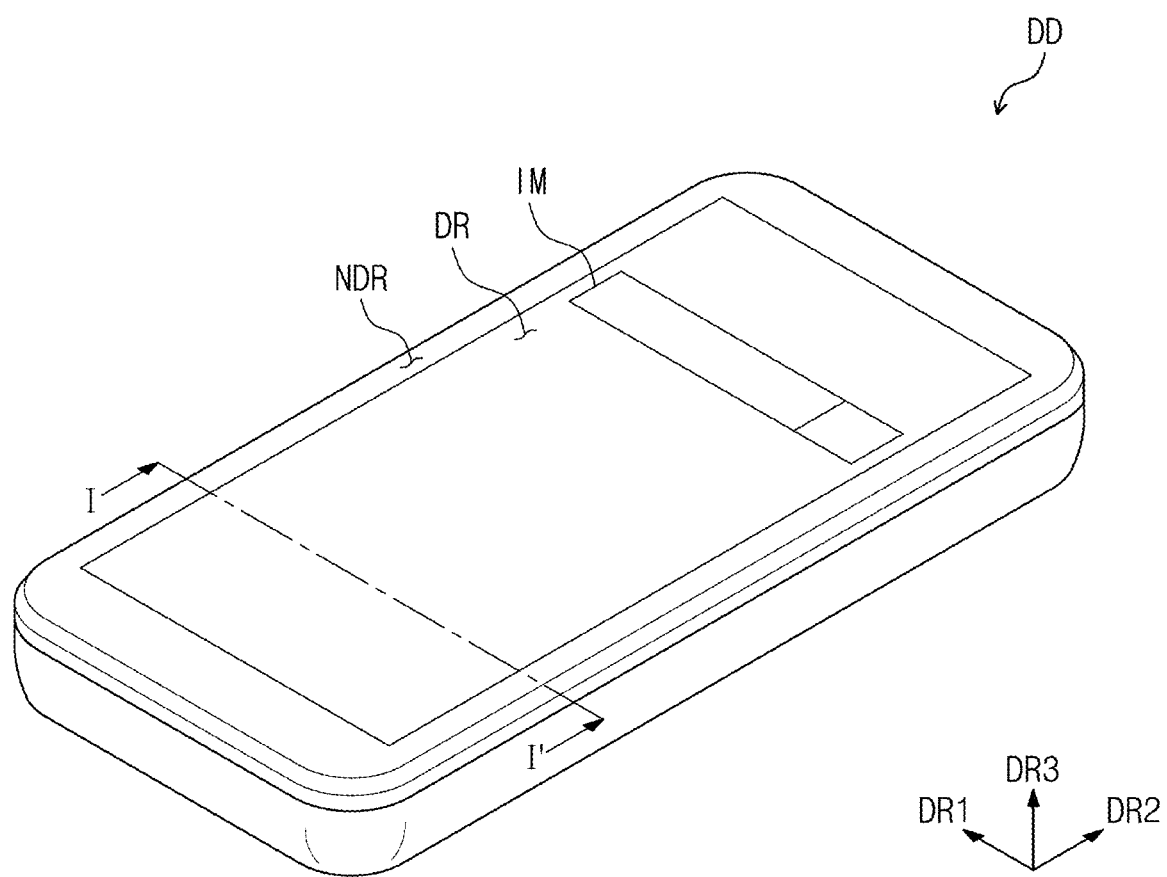
FIG. 1 is a perspective view of a display device including a window member according to an embodiment of the present disclosure.

Hereinafter, embodiments will be described with reference to the drawings. In the present specification, when an element (or region, layer, portion, etc.) is referred to as being "on", "connected", or "coupled to" another element, the element may be directly connected/coupled onto another component, or a third element may be disposed therebetween.

Like reference numerals refer to like elements. Also, in the drawings, thickness, ratio, and dimensions of elements are exaggerated for an effective explanation of the technical content. "and/or" include all combinations of one or more of which the associated configurations can define.

Although the terms first, second, etc. may be used herein to describe various elements, these elements should not be limited by these terms. These terms are only used to distinguish one element from another element. For example, without departing from the teachings of the inventive concept, a first element could be termed a second element, and similarly, a second element could also be termed a first element. The singular forms are intended to include the plural forms as well, unless the context clearly indicates otherwise.

Also, terms such as "under", "on the lower side", "above", "on the upper side" and the like are used to describe the relationship of the configurations shown in the drawings. The terms are described relative to the direction shown in the figure, in a relative concept.

It will be understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"(Meth)acrylate" represents acrylate and methacrylrate, "(meth)acryl" represents acryl and methacryl, and "(meth)acryloyl" represents acryloyl and methacryloyl.

"Monomeric body" and "monomer" are the same meaning. A monomer in the present disclosure is distinguished from an oligomer and a polymer, and refers to a compound having a weight average molecular weight of 1,000 or less. In the present specification, "polymerizable functional group" refers to a group involved in a polymerization reaction, for example, a (meth)acrylate group".

Hereinafter, a photocurable resin composition according to an embodiment of the present disclosure will be described.

The photocurable resin composition according to an embodiment of the present disclosure may be used for forming a pattern layer of a window member included in a display device. The photocurable resin composition according to an embodiment of the present disclosure may be used for forming a photocurable resin layer disposed on one surface of the widow member for the display device. More specifically, the photocurable resin composition according to an embodiment of the present disclosure is applied on one surface of the widow member and then ultraviolet cured, thereby being capable of forming the pattern layer having a specific decoration pattern in a bezel area of the window member.

The photocurable resin composition according to an embodiment of the present disclosure includes a (meth)acrylic resin, a urethane acrylate oligomer, a photopolymerizable monomer, and a photopolymerization initiator.

In the photocurable resin composition of the present disclosure, the (meth)acrylic resin controls the crosslinking density of an entire coating film to define the strength of the coating film and the durability at high temperature, and serves to improve flexibility, and the adhesive property and attachment property with other materials. The (meth)acrylic resin may use typical ingredients known in the art without limitation, and may be prepared by, for example, a typical solution polymerization method or suspension polymerization method.

Examples of (meth)acrylic monomers capable of being used for preparing a (meth)acrylic resin may include, but are not limited to, methyl(meth)acrylate, ethyl(meth)acrylate, n-propyl(meth)acrylate, propyl(meth)acrylate, n-butyl(meth)acrylate, i-butyl(meth)acrylate, sec-butyl(meth)acrylate, t-butyl(meth)acrylate, 2-ethylhexyl(meth)acrylate, lauryl(meth)acrylate, tridecyl(meth)acrylate, stearyl(meth)acrylate, cyclohexyl(meth)acrylate, benzyl(meth)acrylate, tetrahydrofurfuryl(meth)acrylate, 2-hydroxyethyl(meth)acrylate, 2-hydroxypropyl(meth)acrylate, 2-methoxyethyl(meth)acrylate, 2-ethoxyethyl(meth)acrylate, 2-butoxyethyl(meth)acrylate, 2-phenoxyethyl(meth)acrylate, allyl(meth)acrylate, glycidyl(meth)acrylate, dimethylaminoethyl(meth)acrylate, or at least two mixtures thereof.

In the preparation of the (meth)acrylic resin, in addition to the (meth)acrylic monomer ingredient: a vinyl monomer such as acrylamide, acrylonitrile, vinyl acetate, ethylene, propylene, isobutylene, butadiene, isoprene and chloroprene; an ethylenically unsaturated monomer containing an epoxy group such as glycidyl(meth)acrylate, methyl glycidyl(meth)acrylate, allyl glycidyl ether and 3,4-epoxy cyclohexyl methyl(meth)acrylate; an ethylenically unsaturated monomer containing a carboxyl group such as (meth)acrylic acid, crotonic acid, itaconic acid, maleic acid, and fumaric acid; an ethylenically unsaturated monomer containing a hydroxyl group such as hydroxyethyl methacrylate and 2-hydroxypropyl methacrylate; and the like may be included alone or in combinations of two or more as a copolymer ingredient.

The (meth)acrylic resin included in the photocurable resin composition of the present disclosure is suitably to be a non-reactive (meth)acrylic resin having a weight average molecular weight of about 10,000 to about 70,000 and a glass transition temperature of about 50° C. to about 90° C. When a resin having a glass transition temperature of less than 50° C. is applied, the glass transition temperature of the entire cured product is also lowered, and scratches, dents during the process, or the like may remain at room temperature. When a resin having a glass transition temperature of higher than 90° C. is applied, the glass transition temperature of the entire cured product is increased, and the hardness is high, but cracks may easily occur. When a weight average molecular weight is less than about 10,000, the adhesion is lowered and bad adhesion appears under high temperature and high humidity conditions. When a resin having a weight average molecular weight of more than about 70,000 is applied, the viscosity of the entire composition is increased and the workability is weakened, and the accuracy of optical pattern imprinting is lowered, so that the (meth)acrylic resin is suitably applied within the above molecular weight range.

The urethane acrylate oligomer may be an aliphatic urethane acrylate obtained by reacting an aliphatic polyol with a diisocyanate and an acrylate. The urethane acrylate oligomer may have a weight average molecular weight of about 5,000 to about 15,000. While the (meth)acrylic resin does not react upon ultraviolet irradiation, the urethane acrylate oligomer may be bonded to other oligomers and photopolymerizable monomers through an ultraviolet curing reaction to form a network structure. When the acrylate reaction group of the urethane acrylate oligomer is 3 or more, the degree of crosslinking is increased to improve the hardness and mechanical properties of the cured product, but the adhesion is lowered, so that it is suitable for the acrylate to have two reaction groups per molecule.

The urethane acrylate may be included in an amount of about 10 to about 50 parts by weight, based 100 parts by weight of the (meth)acrylic resin. The amount of the urethane acrylate corresponds to the above-described range, so that a coating film formed through the photocurable resin composition of the present disclosure may have appropriate hardness and interlayer bonding strength.

The photopolymerizable monomer is used as a reactive diluent of a photoreactive polymer to impart the workability by controlling the viscosity of the resin composition, and may serve as a crosslinking agent for controlling the crosslinking density between polymers. For the coating film formed of the photocurable resin composition according to an embodiment of the present disclosure, the photopolymerizable monomer is included so as to assist curing properties such as the hardness of the coating film, adhesive property, scratch resistance, and hardness.

The photopolymerizable monomer may be a (meth) acrylic monomer. The (meth)acrylic monomer may use a known (meth)acrylate monomer containing at least one unsaturated group capable of photopolymerization in the molecule without limitation.

In general, the (meth)acrylic monomer may be classified into a monofunctional acrylic monomer (1), a bifunctional acrylic monomer (2), and a polyfunctional acrylic monomer (3 or more), depending on the number of a polymerizable functional group included in one molecule such as (meth) acrylate groups.

In the photocurable resin composition according to the present disclosure, the monofunctional, bifunctional, and polyfunctional acrylic monomers may be each distinguished and used as a polymerizable monomer, or the monofunctional, bifunctional, and polyfunctional acrylic monomers may be used in combination.

Examples of the monofunctional (meth)acrylic monomer include methyl(meth)acrylate, ethyl(meth)acrylate, propyl(meth)acrylate, n-butyl(meth)acrylate, isobutyl(meth)acrylate, tert-butyl(meth)acrylate, 2-ethylhexyl(meth)acrylate, isodecyl(meth)acrylate, isoamyl(meth)acrylate, isomyristyl (meth)acrylate, n-lauryl(meth)acrylate, n-stearyl(meth)acrylate, isostearyl(meth)acrylate, long-chain alkyl(meth)acrylates, n-butoxyethyl(meth)acrylate, butoxydiethyleneglycol (meth)acrylate, cyclohexyl(meth)acrylate, tetrahydrofurfuryl(meth)acrylate, butoxyethyl(meth)acrylate, 2-ethylhexyl-diglycol(meth)acrylate, dicyclopentenyl (meth)acrylate, dicyclopentenyloxyethyl(meth)acrylate, dicyclopentanyl(meth)acrylate, benzyl(meth)acrylate, 2-hydroxyethyl(meth)acrylate, 2-hydroxypropyl(meth)acrylate, 2-hydroxybutyl(meth)acrylate, 2-(2-vinyloxyethoxy)ethyl (meth)acrylate, glycidyl(meth)acrylate, methoxyethyleneglycol-modified (meth)acrylate, ethoxyethyleneglycol-modified (meth)acrylate, propoxyethyleneglycol modified (meth)acrylate, methoxypropylene glycol-modified (meth) acrylate, ethoxypropyleneglycol-modified (meth)acrylate, propoxypropyleneglycol-modified (meth)acrylate, tetrahydrofuryl(meth)acrylate, acryloyl morpholine, or the like.

In addition, examples of the monofunctional (meth)acrylate having an aromatic ring include phenoxymethyl(meth) acrylate, phenoxyethyl(meth)acrylate, phenoxyethyleneglycol-modified (meth)acrylate, phenoxypropyleneglycol-modified (meth)acrylate, hydroxyphenoxyethyl(meth) acrylate,2-hydroxy-3-phenoxypropyl(meth)acrylate, hydroxyphenoxyethyleneglycol-modified (meth)acrylate, hydroxyphenoxypropyleneglycol-modified (meth)acrylate, alkylphenolethyleneglycol-modified (meth)acrylate, alkylphenolpropyleneglycol-modified (meth)acrylate, ethoxylated o-phenylphenol(meth)acrylate, isobornyl(meth) acrylate, or the like.

Examples of the bifunctional (meth)acrylic monomer include ethyleneglycol di(meth)acrylate, propyleneglycol di(meth)acrylate, tipropyleneglycol di(meth)acrylate, polyolefinglycol di(meth)acrylate, polyethyleneglycol di(meth) acrylate, ethoxylated polypropyleneglycol di(meth)acrylate, 2-hydroxy-1,3-dimethacryloxypropane, dioxaneglycol di(meth)acrylate, tricyclodecanedimethanol di(meth)acrylate, 1,4-butanediol di(meth)acrylate, glycerin di(meth)acrylate, 1,6-hexanediol di(meth)acrylate, 1,9-nonanediol di(meth)acrylate, 1,10-decanediol di(meth)acrylate, neopentylglycol di(meth)acrylate, 2-methyl-1,8-octanediol di(meth)acrylate, 1,9-nonanediol di(meth)acrylate, butylethylpropanediol di(meth)acrylate, 3-methyl-1,5-pentanediol di(meth)acrylate, or the like.

In addition, examples of the bifunctional (meth)acrylates having an aromatic ring include ethoxylated bisphenol A di(meth)acrylate, propoxylated ethoxylated bisphenol A di(meth)acrylate, ethoxylated bisphenol F di(meth)acrylate, or the like.

Examples of the polyfunctional (meth)acrylic monomers include ethoxylated glycerin tri(meth)acrylate, trimethylolpropane tri(meth)acrylate, ethoxylated trimethylolpropane tri(meth)acrylate, propoxylated trimethylolpropane tri (meth)acrylate, pentaerythritol tri(meth)acrylate, or the like (trifunctional monomer); pentaerythritol tetra(meth)acrylate, ditrimethylolpropane tetra(meth)acrylate, ethoxylated pentaerythritol tetra(meth)acrylate, or the like (tetrafunctional monomer); dipentaerythritol hexa(meth)acrylate (pentafunctional monomer), dipentaerythritol polyacrylate, or the like.

The photocurable resin composition of the present disclosure may mix and use a (meth)acrylic monomer having a low viscosity, a (meth)acrylic monomer having a relatively high glass transition temperature Tg, or a (meth)acrylic monomer having a relatively low glass transition temperature Tg in order to improve the viscosity, processabilty, weatherability, adhesive property, and the like of the photocurable resin composition.

The photocurable resin composition of the present disclosure may use monofunctional, bifunctional, and polyfunctional (meth)acrylic monomers in combination. When monofunctional, bifunctional, and polyfunctional (meth)acrylic monomers are used in combination, the monofunctional (meth)acrylic monomer, the bifunctional (meth)

acrylic monomer, and the polyfunctional (meth)acrylic monomer may be sequentially used in a weight ratio of about 1:about 0.5 to about 1.5:about 0.2 to about 1 (about 1:0.5 to about 1.5:0.2-1).

Examples of the (meth)acrylic monomers used as a photocurable resin composition of the present disclosure may include at least one selected from monofunctional isoboryl acrylate, tetrahydrofuryl acrylate, tetrahydrofurfuryl acrylate, acryloyl morpholine (ACMO) or 2-phenoxyethyl acrylate; bifunctional tripropyleneglycol diacrylate, polyethyleneglycol diacrylate or 1,6-hexane diol diacrylate; polyfunctional trimethylolpropane triacrylate, pentaerythritol triacrylate or dipentaerytritol hexaacrylate, or may include at least two mixtures thereof. However, the embodiment is not limited to the above-mentioned (meth)acrylic monomer, and the above-mentioned monofunctional to polyfunctional (meth)acrylic monomers may be used without limitation.

For example, when isobornyl acrylate and/or acryloylmorpholine are used among the monofunctional (meth) acrylic monomer, even a solventless type composition may exhibit good solubility and fast curability.

The amount of the photopolymerizable monomer in the photocurable resin composition may be about 400 to about 600 parts by weight, based on 100 parts by weight of the (meth)acrylic resin. As the amount of the (meth)acrylic monomer is within the above range, the viscosity of the composition and the crosslinking density may be properly controlled, thereby improving the adhesive property of the cured coating film and improving workability.

The photopolymerization initiator is excited by ultraviolet rays or the like in the photocurable resin composition according to an embodiment of the present disclosure, thus playing a role to initiate photopolymerization. The polymerization initiator may use a typical photopolymerization initiator in the art without limitation.

Examples of the polymerization initiators include at least one selected from the group consisting of Irgacure 184(1-Hydroxy-cyclohexyl-phenylketone), igacure 369(2-Benzyl-2-(dimethylamino)-1-[4-(4-morpholinyl)phenyl]-1-butanone), irgacure 651 ($\alpha,\alpha'$-dimethoxy-$\alpha$-phenylacetophenone), irgacure 819((phenylphosphoryl)bis (mesitylmethanone)), irgacure 907(2-Methyl-1-[4-(methylthio)phenyl]-2-(4-morpholinyl)-1-propanone), benzionalkylether, benzophenone, benzyl dimethyl katal, hydroxycyclohexyl phenylacetone, chloroacetophenone, 1,1-Dichloro acetophenone, diethoxy acetophenone, hydroxy acetophenone, 2-Choro thioxanthone, 2-ETAQ(2-EthylAnthraquinone), 1-hydroxy-cyclohexyl-phenyl-ketone), 2-hydroxy-2-methyl-1-phenyl-1-propanone, 2-hydroxy-1-[4-(2-hydroxyethoxy)phenyl]-2-methyl-1-propanone, or methylbenzoylformate.

In the photocurable resin composition of the present disclosure, the photoinitiator is included in an amount of about 20 to about 40 parts by weight, based on 100 parts by weight of the (meth)acrylic resin. As the photoinitiator is within the above range, the photopolymerization reaction may be sufficiently carried out without lowering physical properties of the coating film.

In addition, the photocurable resin composition may further include an additive selected from the group consisting of a silane-based compound and a siloxane-based compound.

The silane-based compound may serve to impart adhesive property to the coating film formed as the photocurable resin compound, and the siloxane-based compound may serve as a wetting agent to impart wetting to the coating film formed as the photocurable resin composition.

The amount of the silane-based compound or the siloxane-based compound is not limited, and for example, may be each included in about 0.1 to about 5 parts by weight based on the total weight of the photocurable resin composition.

The photocurable resin compound according to the present disclosure may include, without limitation, functional additives known in the art to the extent that the effect of the present disclosure is not impaired. The functional additive may be included in an amount of about 1 to about 10 parts by weight based on 100 parts by weight of the (meth)acrylic resin. Examples of the functional additive capable of using include antioxidants, lubricants, leveling agents, surfactants, adhesion promoters, defoamers, slip agents, solvents, wetting agents, light stabilizers, stain inhibitors, softeners, thickeners, polymers, or the like. The additives may be used alone, or in combination of two or more.

The antioxidant is an agent inhibiting the degradation caused by heat or light irradiation and the degradation caused by various oxidizing gases such as ozone, active oxygen, NOx, or Sox (x is an integer). By adding the antioxidant, the coloring of the coating film may be prevented, and the reduction of the film thickness due to decomposition may be reduced. Examples of the antioxidant capable of using include hydrazides, hindered amine-based antioxidants, nitrogen-containing heterocyclic mercapto-based compounds, thioether-based antioxidants, hindered phenol-based antioxidants, ascorbic acids, zinc sulfate, thiocyanate salts, thiourea derivatives, sugars, nitrites, sulfites, thiosulfates, hydroxylamine derivatives, or the like.

The leveling agent may be included for further increasing an adhesion in the composition by leveling such that the curing composition is applied flatly and smoothly upon applying. The leveling agent may include acrylic type, silicon type or the like, alone or in combination of two or more kinds. For example, the leveling agent may include polyether-modified polydimethylsiloxane and may include a (meth)acryloyl group added in a polyether chain.

The surfactant may include for the mixing and applying uniformity of the curable product. The surfactant may use a cationic, anionic, amphoteric, or nonionic surfactant typically known in the art. For example, the surfactant may use at least one of a fluorine-based surfactant, a silicon-based surfactant or a fluorine silicon-based surfactant.

The deformer is a mixture of lipophilic fluids and polysiloxane, and may serve to improve the appearance of the coating film by breaking bubbles generated during applying. The defoamer may be included in an amount of about 0.1 to about 3 parts by weight, based on 100 parts by weight of the functional additive.

The light stabilizer is an ultraviolet absorber, which has an effect of increasing the weatherability of the coating film. The light stabilizer may be included in an amount of about 1.0 to about 3 parts by weight, based on 100 parts by weight of the functional additive, and has an effect of improving the weatherability of the coating film within the above-mentioned range.

The softener is used for alleviating the occurrence of cracks in the dried coating film, and may be included in an amount of about 0.5 to about 5 parts by weight, based on 100 parts by weight of the functional additive. The softener may alleviate the occurrence of cracks in the cured coating film within the above-mentioned range to improve the impact resistance and bending resistance.

The photocurable resin composition according to the present embodiment is used in a process for producing a window member applied to the display device, and specifically, may be used for forming a resin layer forming a decoration pattern in the bezel area of the window member.

The photocurable resin composition according to an embodiment of the present disclosure is prepared by blending a non-curable acrylic resin with a photocurable resin. The photocurable resin composition according to such an embodiment of the present disclosure is based on a photocurable resin including a urethane acrylate oligomer and a photopolymerizable monomer, wherein the (meth)acrylic resin copolymerizing an acrylic monomer is mixed in the above-mentioned numeric range or the like, and physical properties may be controlled.

Thus, the coating film formed of a photocurable resin composition according to an embodiment of the present disclosure has a flexible property, and a glass transition temperature Tg may be controlled to improve the adhesion, surface hardness and the like of the coating film.

Hereinafter, a window member according to an embodiment of the present disclosure and a method for preparing the same will be described.

Figure 2:
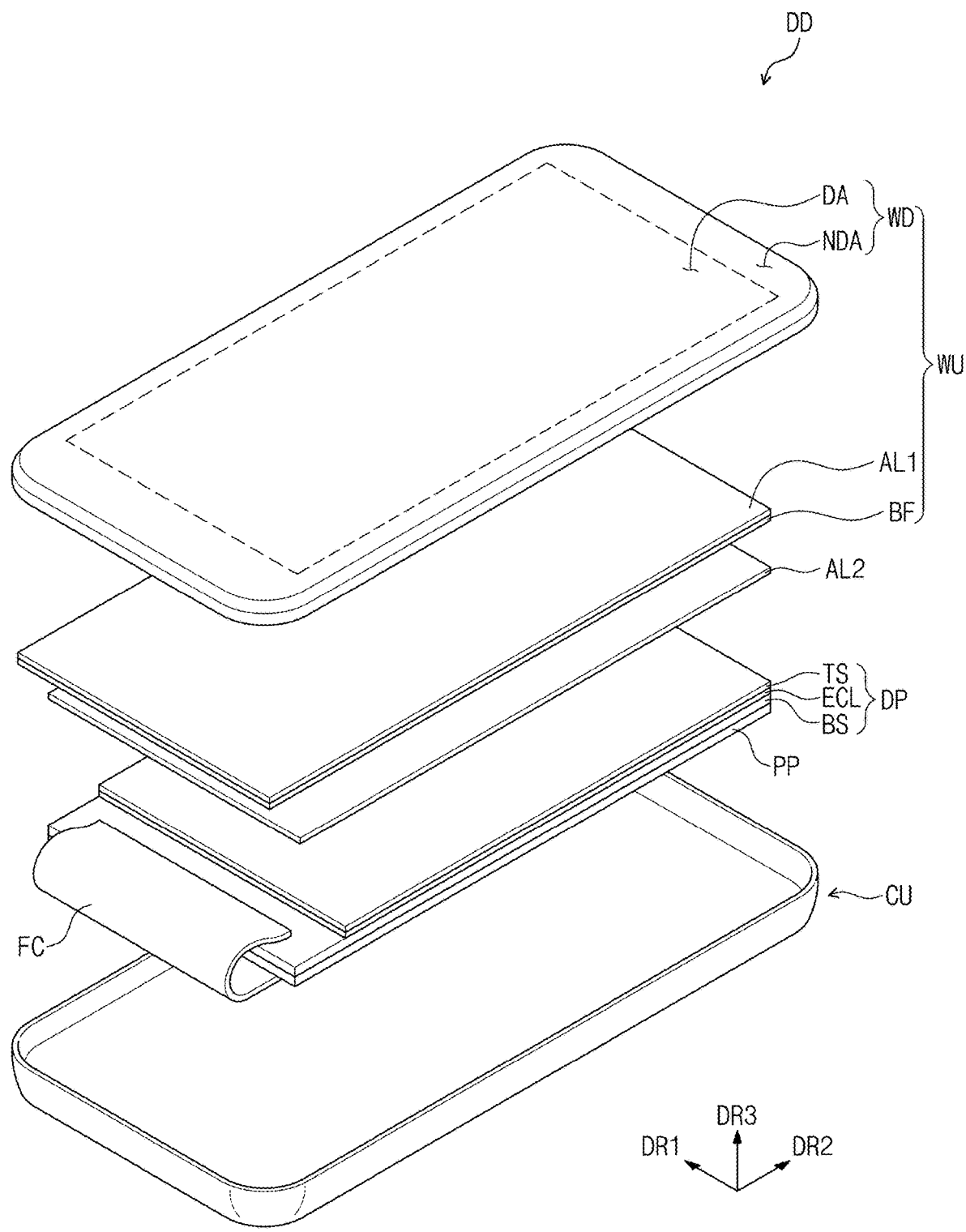
FIG. 2 is an exploded perspective view of the display device illustrated in FIG. 1.
Figure 3:
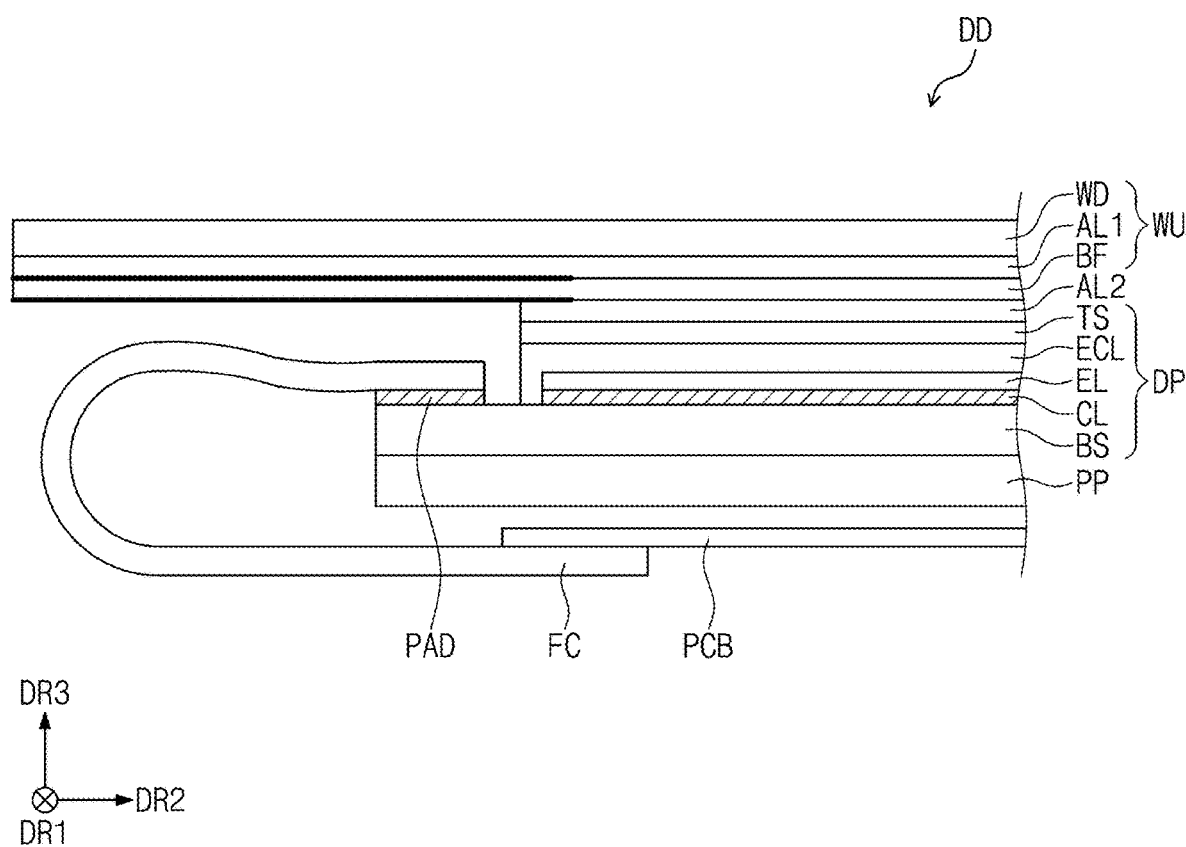
FIG. 3 is a cross-sectional view illustrating a portion of the display device illustrated in FIG. 1.

FIG. 1 is a perspective view of a display device DD including a window member WU according to an embodiment of the present disclosure. FIG. 2 is an exploded perspective view of the display device illustrated in FIG. 1. FIG. 3 is a cross-sectional view illustrating a portion of the display device DD illustrated in FIG. 1. Hereinafter, the display device DD including the window member WU according to an embodiment of the present disclosure will be described with reference to FIGS. 1 to 3.

As an example of the display device DD according to an embodiment of the present disclosure, a flat portable terminal is exemplarily illustrated. However, the embodiment of the present disclosure is not limited thereto, and may be applied to various display devices DD such as a curved display device, a banding display device, a rollable display device, a foldable display device, and a stretchable display device. Further, although not illustrated, the display device DD according to the present disclosure may be used as a large-sized electronic device such as a television or an external billboard, and a small and medium-sized electronic device such as a personal computer, a notebook computer, a personal digital terminal, a car navigation unit, a game player, a portable electronic device, a wrist watch type electronic device, and a camera. These are merely provided as examples, and it should be understood that other electronic devices may be also applied as long as not departing from the scope of the present disclosure.

The display device DD includes a plurality of regions defined on a display surface. The display device DD may include a display region DR for displaying an image IM and a non-display region NDR adjacent to the display region DR. A display surface for displaying the image IM is parallel to a surface defined by a first direction DR1 and a second direction DR2, and the normal direction of the display surface is indicated by a third direction DR3. The third direction DR3 is a reference axis separating the front and rear surfaces of the respective members. In this application, the surface defined by the first direction DR1 and the second direction DR2 is defined as a plane, and viewed on the plane may be defined as viewed in the third direction DR3.

The display device DD may include a display panel DP, the window member WU and a collection member CU.

The display panel DP may be divided, on a plane, into a display region overlapping the display region DR of the display device DD and a non-display region overlapping the non-display region NDR of the display device DD. The display panel DP may provide images corresponding to image data input through the display region DR.

The display panel DP may be employed in various forms such as an organic light emitting display panel, a liquid crystal display panel, a plasma display panel, an electrophoretic display panel, and an electrowetting display panel. In the present embodiment, the display panel DP as an organic light emitting display panel will be described as an example.

The display panel DP may include a base substrate BS, a circuit layer CL, an organic light emitting device layer EL, an encapsulation layer ECL, a pad unit PAD, and a touch sensing unit TS.

The base substrate BS may include at least one of a glass substrate, a sapphire substrate, or a plastic substrate. On the base substrate BS, the circuit layer CL, the organic light emitting device layer EL, the encapsulation layer ECL, the pad unit PAD, the touch sensing unit TS and the like may be disposed.

The circuit layer CL may include a plurality of signal lines and electronic devices. For example, the circuit layer CL may include a thin film transistor corresponding to each of gate lines, data lines, and pixels.

The organic light emitting device layer EL may generate light of a color corresponding to a light emitting material. The color may include red, green, blue and white, but is not limited thereto.

The encapsulation layer ECL may include a thin film encapsulation layer, that is, a plurality of inorganic thin films and a plurality of organic thin films. The encapsulation layer ECL may cover the organic light emitting device layer EL and block air and moisture to protect the organic light emitting device layer EL. In an embodiment of the present disclosure, the encapsulation layer ECL may be replaced by an encapsulation substrate. The encapsulation substrate is spaced apart from the base substrate BS with the organic light emitting device layer EL in-between. The encapsulation substrate and the base substrate BS may be bonded by a sealing agent disposed along the edge of the base substrate BS.

The touch sensing unit TS may be disposed on the encapsulation layer ECL. The position of the touch sensing unit TS is exemplarily illustrated, but is not limited thereto. For example, the touch sensing unit TS may be disposed between the organic light emitting device layer EL and the encapsulation layer ECL, and may be disposed between the base substrate BS and the circuit layer CL. Further, the touch sensing unit TS may be included in the window member WU rather than in the display panel DP.

The touch sensing unit TS may acquire the coordinate information of input point. The touch sensing unit TS is classified into a resistance film method, a capacitance method, an electromagnetic induction method, or the like. In the present embodiment, the touch sensing unit TS may be a capacitance type touch panel. The touch sensing unit TS may include two kinds of sensors crossing each other, but the kind thereof is not limited. The capacitance type touch panel may acquire the coordinate information of a touched point by a self-capacitance method or a mutual-capacitance method.

In addition, although not illustrated, the display panel DP may include an optical member. The optical member may be disposed on the touch sensing unit TS. However, the position of the optical member is not limited. The optical member may include at least one of a phase retardation plate and a polarizing plate.

When the optical member includes both the phase retardation plate and the polarizing plate, the polarizing plate may be disposed on the retardation plate. External light incident from the outside of the widow member WU passes through the polarizing plate and is linearly polarized. The linearly polarized incident light passes through the phase retardation plate, followed by being reflected and passing the phase retardation again, and then is incident to the polarizing plate. The linearly polarized incident light has a phase difference of a 45 degree while passing through the phase retardation plate and is circularly polarized to change a phase.

As a result, the external light passes through the phase retardation plate again, then not passing through the polarizing plate and being mostly disappeared. For example, the light which is circularly polarized with turning right while passing through the phase retardation plate is reflected and is changed into left-turning circularly polarized light, and the right-turning circularly polarized light and the left-turning circularly polarized light may disappear by destructive interference. Therefore, the external light reflectance of the display device DD is reduced.

The pad unit PAD may include pads electrically connected in a one-to-one correspondence with a plurality of signal lines electrically connected to a plurality of pixels. The pad unit PAD may be electrically connected to a flexible circuit board FC.

The flexible circuit board FC may be attached to one end of the display panel DP and bent toward the rear surface of the display panel DP. The flexible circuit board FC may be electrically connected to the pad unit PAD and may receive signals for driving the display panel DP from a driving circuit board PCB. Further, the flexible circuit board FC may transfer the signals to the display panel DP. A data driving chip (not illustrated) may be mounted on one surface of the flexible circuit board FC. The data driving chip may generate a data signal applied to the data lines of the display panel DP in response to an external signal.

The driving circuit board PCB may be disposed on the rear surface of the display panel DP. The driving circuit board PCB may be electrically connected to the display panel DP by the flexible circuit board FC. The driving circuit board PCB may provide an image signal for displaying an image to the display panel DP and a control signal for driving the display panel DP.

The driving circuit board PCB includes a base substrate, wherein the base substrate may be a flexible printed circuit board. In this case, the base substrate may be a flexible plastic substrate made of polyamide, polyester, or the like.

A protective member PP may be disposed between the display panel DP and the driving circuit board PCB. The protective member PP may include at least one of a buffer member and a radiation member. The buffer member may include a material having a high shock absorption rate. For example, the buffer member is formed of, but is not limited to, a polymer resin (for example, polyurethane, polycarbonate, polypropylene and polyethylene), a rubber liquid, a urethane-based material, or a sponge formed by foam molding an acryl-based material.

The radiation member may include, but is not limited to, at least one of graphite, copper (Cu), or aluminum (Al) having a good radiation property. The radiation member may not only improve the radiation property, but also have electromagnetic wave shielding and electromagnetic wave absorption properties.

The window member WU may be disposed on the display panel DP. The window member WU and the display panel DP may be attached to each other by a panel adhesive layer AL2. The panel adhesive layer AL2 may include an optically clear adhesive film or an optical clear resin. In another embodiment of the present disclosure, the panel adhesive layer AL2 may not be provided herein. In this case, the window member WU and the display panel DP may be in contact with each other without the panel adhesive layer AL2, or may be disposed with a predetermined space therebetween.

The window member WU may include a cover member WD, a window adhesive layer AL1, and a light transmissive film BF.

The cover member WD may include, but is not limited to, at least one of a silicon substrate, a glass substrate, a sapphire substrate, or a plastic film. In examples of the present disclosure, the cover member WD may be a glass substrate.

The light transmissive film BF may be a transparent film through which light is transmitted. The light transmissive film BF is not limited to a light transmittance of 100%. For example, the light transmittance of the light transmissive film BF may have a numeric value of 100% or less. The light transmissive film BF may include, but is not limited to, any one synthetic resin of PET, PVC, PP, PE, PC, and PMMA.

A print layer may be disposed on one surface of the light transmissive film BF. The description thereof will be described in more detail in FIG. 4 below.

The widow adhesive layer AL1 may be disposed between the cover member WD and the light transmissive film BF. The cover member WD and the light transmissive film BF may be attached to each other by the window adhesive layer AL1. The window adhesive layer AL1 may include an optically clear adhesive film or an optical clear resin.

The collection member CU may collect the display panel DP and may be coupled to the window member WU. The collection member CU may include one body in which a plurality of parts is assembled or injection-molded. The collection member CU may include glass, plastic or metal.

Figure 4:
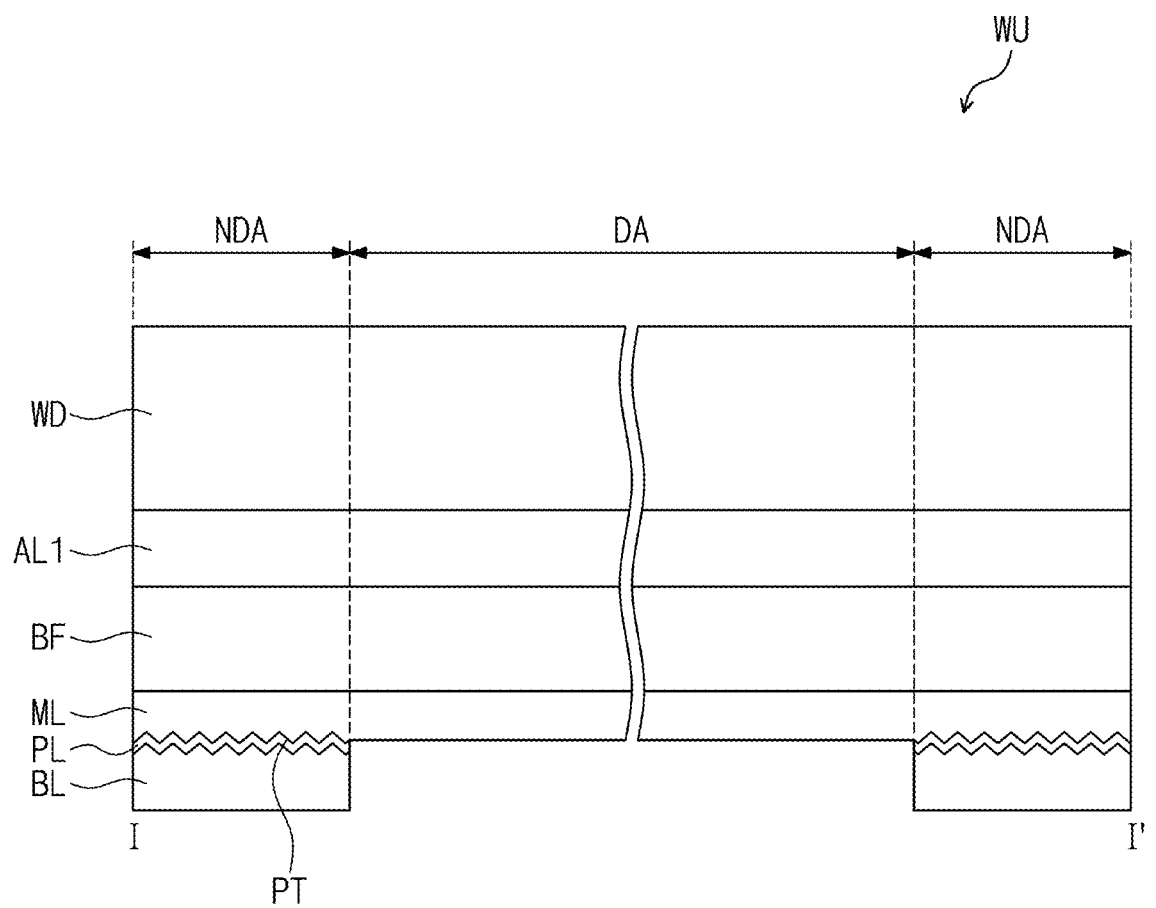
FIG. 4 is a cross-sectional view taken along line I-I' of FIG. 1.
Figure 4:
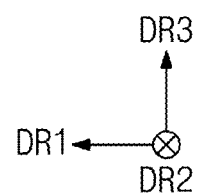

FIG. 4 is a cross-sectional view taken along the line I-I' of FIG. 1. FIG. 4 illustrates only the window member WU, and the drawings of the display panel DP and the collection member CU described in FIG. 3 are not provided herein. Hereinafter, the window member WU according to an embodiment of the present disclosure will be described with reference to FIG. 4. Meanwhile, the same reference numerals are assigned to the same elements as those described in FIGS. 1 to 3, and redundant descriptions will not be provided herein.

Referring to FIG. 4, the window member WU may include the cover member WD, the window adhesive layer AL1, the light transmissive film BF, a deposition layer PL, a molding layer ML, and a light blocking layer BL.

The cover member WD may include a bezel area NDA and a transmissive area DA defined on a plane. The bezel area NDA may overlap the non-display region NDR of FIG. 1 on a plane, and the transmissive area DA may overlap the display region DR of FIG. 1 on a plane.

The light transmissive film BF is disposed under (below) the cover member WD. That is, the light transmissive film BF may be disposed between the cover member WD and the display panel DP (see FIG. 2). The light transmissive film BF may include one surface and an other surface facing each other. The molding layer ML may be disposed on the one surface of the light transmissive film BF, and the cover member WD may be disposed on the other surface thereof.

The molding layer ML may be disposed under the one surface of the light transmissive film BF. The molding layer ML may be directly formed on the one surface of the light transmissive film BF. Although not illustrated, a primer layer for improving an adhesion may be further disposed between the molding layer ML and the light transmissive film BF.

The molding layer ML may be formed using the photocurable resin composition according to an embodiment of the present disclosure.

Specifically, the molding layer ML may be formed through a photocurable resin composition including: about 10 to about 50 parts by weight of the urethane acrylate oligomer; about 400 to about 600 parts by weight of the photopolymerizable monomer; and about 20 to about 40 parts by weight of the photopolymerization initiator, based on 100 parts by weight of the (meth)acrylic resin copolymerizing the acrylic monomer. A detailed description for the photocurable resin composition having the above composition may be applied without change, and thus will not be provided herein.

One surface of the molding layer ML is in contact with the light transmissive film BF, and a pattern PT may be provided (defined) on an other surface of the molding layer ML. The pattern PT may overlap the bezel area NDA on a plane when being viewed from the third direction DR3. FIG. 4 illustrates that the pattern PT overlaps the bezel area NDA on a plane and does not overlap the transmissive area DA, but is not limited thereto, and the pattern PT overlapping the transmissive area DA may be provided.

The pattern PT may irregularly reflect the light incident from the outside. FIG. 4 illustrates exemplarily that the pattern PT has a prism shape, but is not limited thereto. The pattern PT is a decoration pattern, which may be formed into various patterns such as a three-dimensional pattern formed of a fine hair line, or a wavy pattern.

The deposition layer PL may be disposed under the pattern PT. The deposition layer PL may be overlap the bezel area NDA on a plane. The deposition layer PL may include a material having a predetermined color. Further, the deposition layer PL may include a reflective material. The deposition layer PL may reflect or adsorb light incident from the outside. The deposition layer PL may have a structure in which at least one or at least two layers are laminated.

The light blocking layer BL may be disposed under the deposition layer PL. The light blocking layer BL may have a black color, but is not limited thereto. The light blocking layer BL is disposed under the deposition layer PL, so that the color of one area of the window member WU may be seen more clearly.

The light blocking layer BL may be formed through a print process under the deposition layer PL, but is not limited thereto. The light blocking layer BL may be provided as a predetermined subsidiary material. In this case, the light blocking layer BL may be attached under the deposition layer PL.

The window member WU may be fabricated in various colors according to the demand of the user. For example, one area of the window member WU overlapping the bezel area NDA may be seen in various colors such as white, black, blue, gold, pink, and green. The various colors of the one area overlapping the bezel area NDA of the window member WU may be achieved through the pattern PT formed on one surface of the molding layer ML and the deposition layer PL disposed on the pattern PT.

Figure 5:
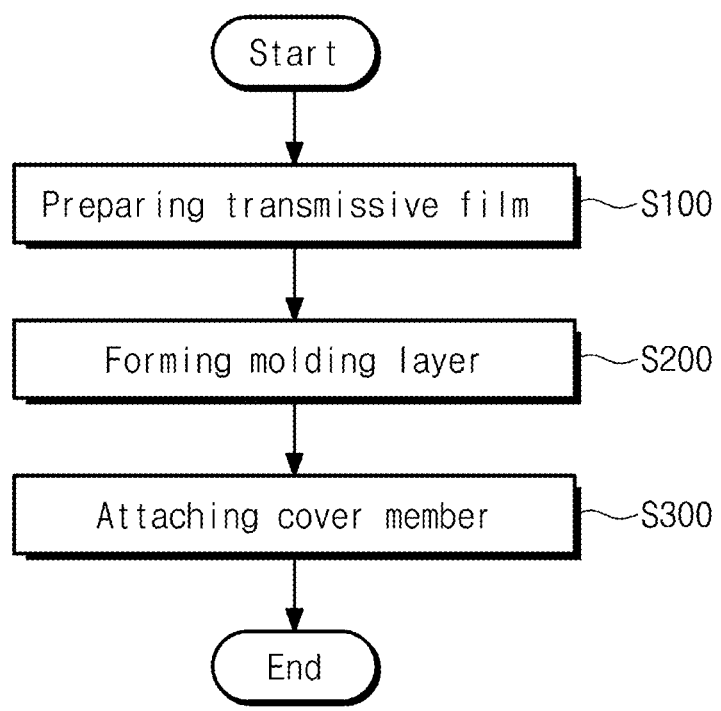
FIG. 5 is a flowchart illustrating a fabrication method of a window member according to an embodiment of the present disclosure.

FIG. 5 is a flowchart illustrating a fabrication method of a window member according to an embodiment of the present disclosure. FIGS. 6A to 6E are cross-sectional views sequentially illustrating a fabrication method of a window member according to an embodiment of the present disclosure. Hereinafter, a fabrication method of a window member according to an embodiment of the present disclosure will be described with reference to FIGS. 5 to 6E.

As illustrated in FIG. 5, a fabrication method of a window member according to an embodiment of the present disclosure includes a preparing a light transmissive film operation S100, a forming a molding layer on one surface of the light transmissive film operation S200, and an attaching a cover member on an other surface of the light transmissive film operation S300.

Figure 6A:
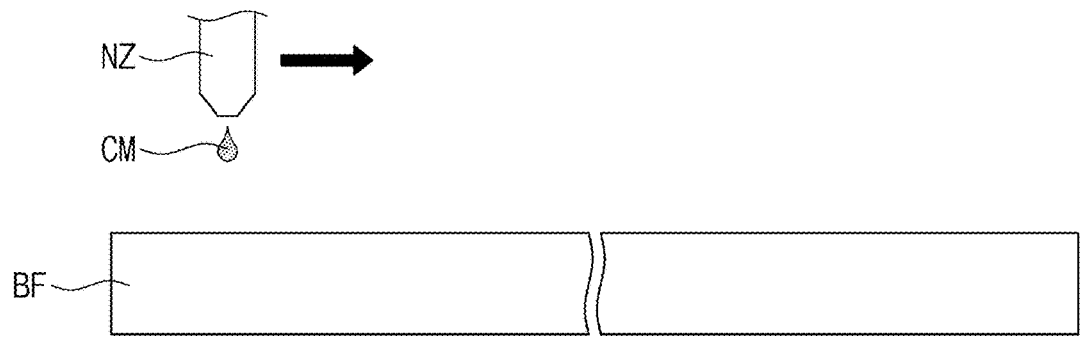
FIGS. 6A, 6B, 6C, 6D, and 6E are cross-sectional views sequentially illustrating a fabrication method of a window member according to an embodiment of the present disclosure.

Referring to FIGS. 5 and 6A, in the preparing a light transmissive film operation S100 and the forming a molding layer on one surface of the light transmissive film operation S200, a photocurable resin composition CM according to the present disclosure is applied in order to form the molding layer on one surface of the prepared light transmissive film BF. The photocurable resin composition CM is included in an amount of about 10 to about 50 parts by weight of the urethane acrylate oligomer, about 400 to 600 parts by weight of the photopolymerizable monomer, and about 20 to about 40 parts by weight of the photopolymerization initiator, based on 100 parts by weight of a (meth)acrylic resin. A detailed description for the photocurable resin composition CM having the above composition may be applied as the above-mentioned description without change, and thus will not be provided herein.

Figure 6B:
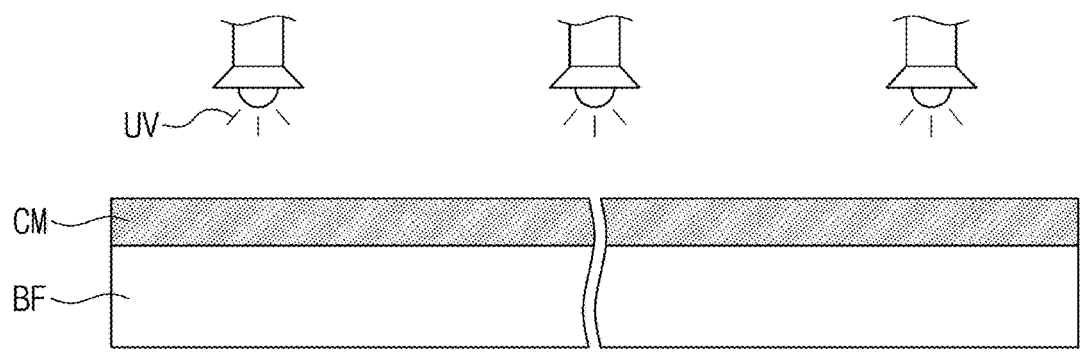

Referring to FIGS. 6A and 6B, the photocurable resin composition CM may be applied using nozzle NZ so as to entirely overlap on one surface of the light transmissive film BF, but is not limited thereto, and may be partially applied on the one surface of the light transmissive film BF.

Figure 6C:
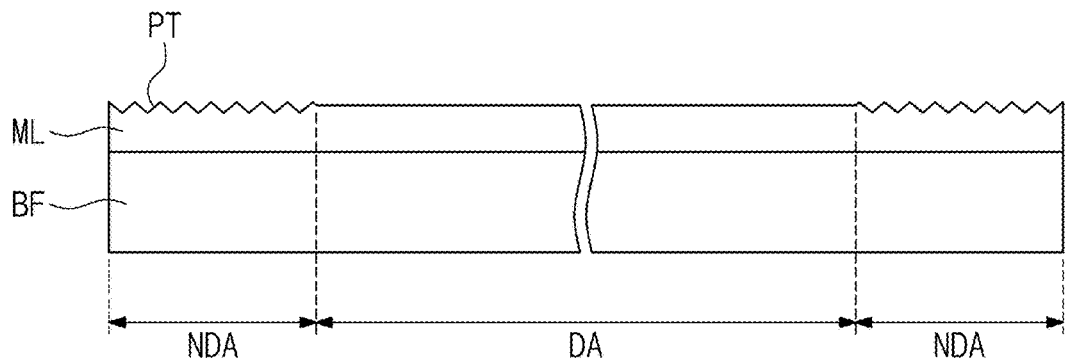
Figure 6C:
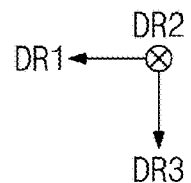
Figure 6D:
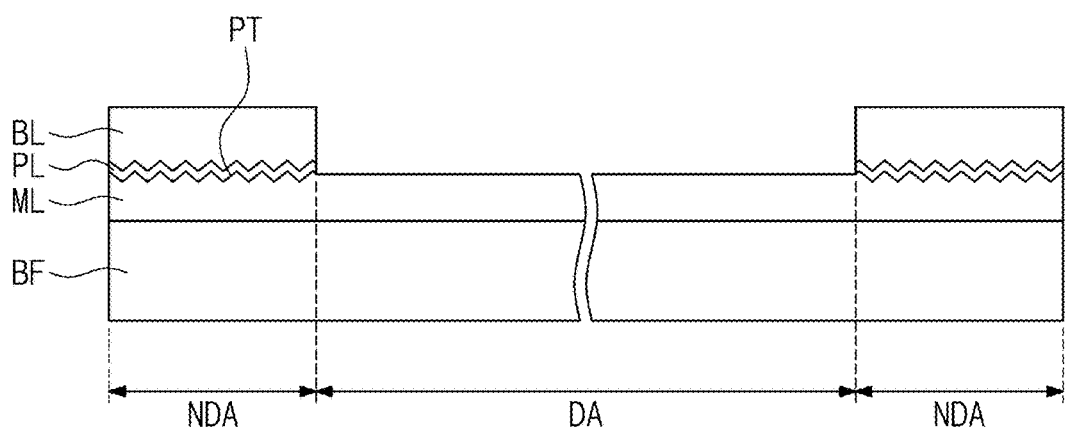
Figure 6D:
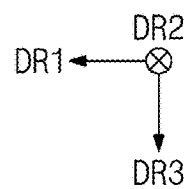

Referring to FIGS. 6B and 6C, the applied photocurable resin composition CM is cured to form the molding layer ML. The photocurable resin composition CM may be cured by ultraviolet UV rays. The photocurable resin composition CM according to an embodiment of the present disclosure includes a photocurable resin capable of being cured by ultraviolet UV rays or the like as one ingredient and may easily form the molding layer ML through ultraviolet UV irradiation. The photocurable resin composition CM may be cured under an ultraviolet curing condition of about 300 $mJ/cm^2$ to about 1500 $mJ/cm^2$.

The pattern PT may be formed on one surface of the molding layer ML. The pattern PT may be formed by curing a predetermined pattern formed on a partial area of the photocurable resin composition CM applied before the photocurable resin composition CM is cured in the process of forming the molding layer ML. The pattern PT may be formed so as to overlap the bezel area NDA overlapping the non-display region NDR (see FIG. 1), but is not limited thereto, and the pattern PT may be formed so as to overlap the transmissive area DA.

Referring to 6D, the deposition layer PL and the light blocking layer BL may be formed on the molding layer ML.

The deposition layer PL may be formed by depositing an organic material or an inorganic material. For example, the deposition layer PL may be formed of an organic material having a predetermined color, or may be formed by depositing a reflective metal oxide and the like.

The light blocking layer BL may be formed with a black ink or an ink having the light blocking property through a print process, but is not limited thereto, and the light blocking layer BL may be provided as a predetermined subsidiary material. In this case, the light blocking layer BL may be attached under the deposition layer PL.

Figure 6E:
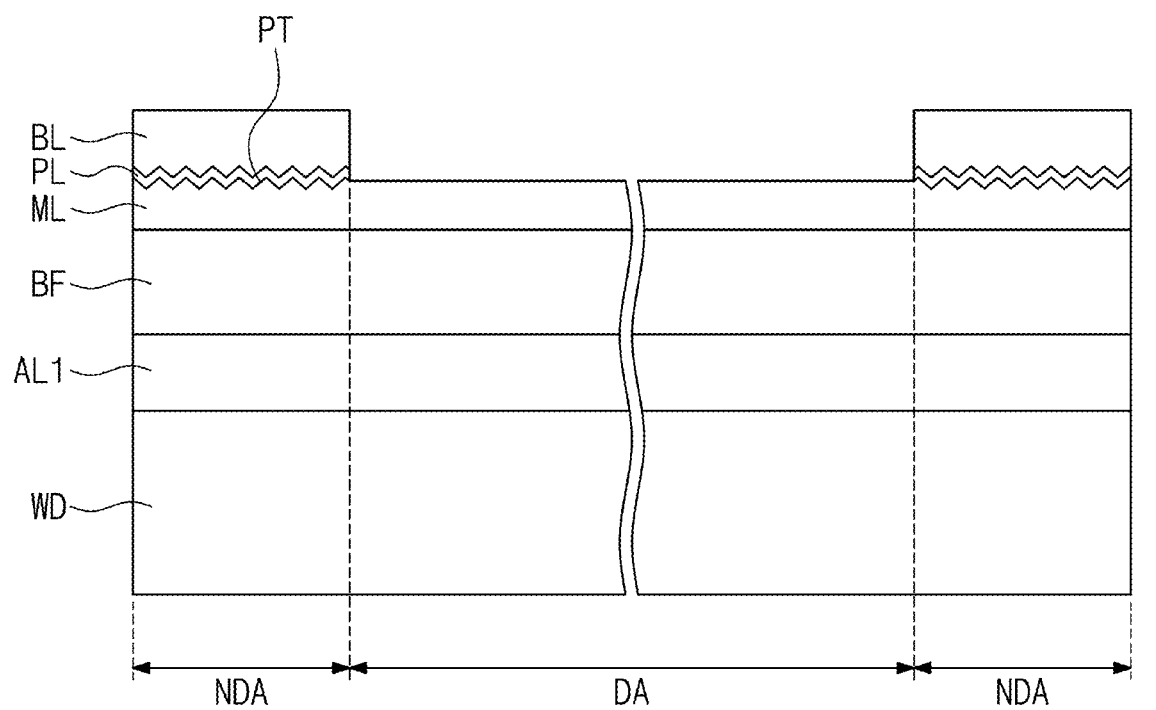
Figure 6E:
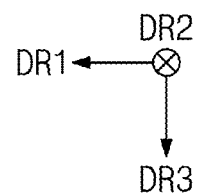

Referring to FIG. 6E, the cover member WD is attached on the other surface of the light transmissive film BF. The cover member WD may be attached on the other surface opposite to the one surface in which the molding layer ML, the deposition layer PL and the light blocking layer BL are formed on the light transmissive film BF. The cover member WD may be attached to the light transmissive film BF through the window adhesive layer AL1. The window adhesive layer AL1 may include an optically clear adhesive film or an optical clear resin.

Although not illustrated, a panel adhesive layer AL2 (see FIG. 2) is further formed on the molding layer ML. The panel adhesive layer AL2 formed on the molding layer ML may be a layer for attaching the display panel DP (see FIG. 2) and the widow member WU. The panel adhesive layer AL2 may be formed so as to cover the deposition layer PL and the light blocking layer BL on the molding layer ML.

The panel adhesive layer AL2 may include an optically clear adhesive film or an optical clear resin. The panel adhesive layer AL2 includes an optically clear adhesive film or an optical clear resin, and thus ultraviolet rays of 3000 mJ/cm$^2$ to 5000 mJ/cm$^2$ may be irradiated in the bonding process.

The window member WU according to the present disclosure includes a molding layer formed using the photocurable resin composition prepared by blending a non-curable acrylic resin with a curable resin. The photocurable resin composition according to an embodiment of the present disclosure is based on a photocurable resin including the urethane acrylate oligomer and the photopolymerizable monomer, but the (meth)acrylic resin copolymerizing the acrylic monomer is mixed in the above-described numeric range or the like, and the physical properties may be controlled.

Accordingly, the molding layer ML of the window member WU formed of the photocurable resin composition according to an embodiment of the present disclosure may be excellent in adhesive property to the deposition layer PL and the light transmissive film BF and not easily peeled off under high temperature and high humidity conditions. Also, the molding layer ML may have excellent weatherability and have a property to be resistant to thermal shock.

In addition, the molding layer ML of the window member WU according to an embodiment of the present disclosure has excellent properties as described above. Thus, when an adhesive layer or the like is formed on the molding layer ML, subjected to additional ultraviolet irradiation in a subsequent process caused by rework or the like, or exposed to high temperature and high humidity conditions, the physical properties are not deteriorated by thermal shock or the like. Accordingly, the occurrence of a crack is prevented, and the peeling or the like between the molding layer ML and the deposition layer PL is prevented, so that a window member WU having excellent quality may be provided.

Hereinafter, the photocurable resin composition according to the present disclosure will be described in detail in conjunction with Examples and Comparative Examples.

(Preparation of Photocurable Resin Composition)

A photocurable resin composition of the present disclosure was prepared by stirring a photopolymerizable monomer ((meth)acrylic monomer), a photopolymerization initiator and a functional additive for 45 minutes by using a high-speed stirrer, then adding a urethane acrylate oligomer to the mixture, further stirring for 1 hour, adding then a (meth)acrylic resin, and by stirring for 1 hour.

The ingredient ratios of the photocurable resin compositions according to Examples 1, 2, 3, 4, and 5 and the photocurable resin compositions according to Comparative Examples 1, 2, 3, and 4 were prepared as shown in Table 1. The unit representing the amount of each ingredient in Table 1 indicates the ratio of each part by weight based on 100 parts by weight of the (meth)acrylic resin.

TABLE 1

| | (Meth)acrylic resin | Urethane acrylate oligomer | Photopolymerization monomer | | | | | | Photopolymerization initiator | | Functional additive | |
|---|---|---|---|---|---|---|---|---|---|---|---|---|
| | | | 1 | 2 | 3 | 4 | 5 | 6 | 1 | 2 | 1 | 2 |
| Example 1 | 100 | 35 | 50 | 150 | 120 | 30 | 100 | 80 | 25 | 10 | 1 | 2 |
| Example 2 | 100 | 35 | 50 | 100 | 120 | 30 | 100 | 100 | 25 | 10 | 1 | 1 |
| Example 3 | 100 | 35 | 50 | 150 | 150 | 30 | 100 | 80 | 25 | 5 | 1 | 2 |
| Example 4 | 100 | 35 | 50 | 150 | 120 | 30 | 100 | 80 | 20 | 10 | 1 | 1 |
| Example 5 | 100 | 35 | 50 | 150 | 120 | 30 | 100 | 80 | 25 | 10 | 1 | 2 |
| Comparative Example 1 | 0 | 135 | 50 | 150 | 120 | 30 | 100 | 80 | 25 | 10 | 1 | 2 |
| Comparative Example 2 | 100 | 0 | 50 | 155 | 155 | 30 | 100 | 80 | 25 | 10 | 1 | 2 |
| Comparative Example 3 | 100 | 35 | 50 | 0 | 0 | 0 | 100 | 80 | 25 | 10 | 1 | 2 |
| Comparative Example 4 | 100 | 35 | 50 | 120 | 120 | 30 | 100 | 80 | 0 | 10 | 0 | 2 |

Specific materials used for the respective ingredients in Table 1 have used the materials listed in Table 2 below. A (meth)acrylic resin having a molecular weight of about 30,000 was used in Examples 1 to 4 and Comparative Examples 1 to 4, and a (meth)acrylic resin having a molecular weight of about 65,000 was used in Example 5. Also, in Table 2, the physical properties of each ingredient was further listed.

TABLE 2

| Ingredient | Ingredient | Physical properties |
|---|---|---|
| (Meth)acrylic resin | MMA—BMA Copolymer (MMA/BMA = 1/0.31) | Glass transition temperature: 75° C. Molecular weight: 30,000 |
| | MMA—BMA Copolymer (MMA/BMA = 1/0.09) | Glass transition temperature: 52° C. Molecular weight: 65,000 |

TABLE 2-continued

| Ingredient | | Ingredient | Physical properties |
|---|---|---|---|
| Urethane acrylate oligomer | | Urethane Acrylate | Viscosity: 5,000 cps (25° C.) Molecular weight: 10,000 |
| Photopolymerizable monomer | 1 | Isobornyl acrylate | Viscosity: 11 cps (25° C.) Glass transition temperature: 88° C. |
| | 2 | 1,6-Hexanediol diacrylate | Viscosity: 8 cps (25° C.) Glass transition temperature: 43° C. |
| | 3 | Pentaerythritol triacrylate | Viscosity: 800 cps |
| | 4 | Acryloyl morpholine | Viscosity: 12 mPas(25° C.) Glass transition temperature: 145° C. |
| | 5 | Tetrahydrofurfuryl acrylate | Viscosity: 2.8 cps Glass transition temperature: −12° C. |
| | 6 | Polyethyleneglycol diacrylate | Glass transition temperature: 7° C. |
| Photopolymerization initiator | 1 | 2-Hydroxy-2-methyl-1-phenyl-propan-1-one | Molecular weight: 164.2 |
| | 2 | Diphenyl(2,4,6-trimethylbenzoyl)phosphine oxide | Molecular weight: 348.4 |
| Functional additive | 1 | Leveling agent (BYK UV3535) | — |
| | 2 | Adhesion promoter (KBM403) | — |

Referring to Tables 1 and 2, the photocurable resin composition according to Example 1 of the present disclosure includes 100 parts by weight of the methylmethacrylate (MMA)-butylmethacrylate (BMA) copolymer, 35 parts by weight of a urethane acrylate oligomer, 50 parts by weight of isobornyl acrylate, 150 parts by weight of 1,6-hexanedioldiacrylate, 120 parts by weight of pentaerythritol triacrylate, 30 parts by weight of acryloyl morpholine, 100 parts by weight of tetrahydrofurfuryl acrylate, 80 parts by weight of polyethyleneglycol diacrylate, 25 parts by weight of 2-hydroxy-2-methyl-1-phenylpropan-1-one, 10 parts by weight of diphenyl(2,4,6-trimethylbenzoyl)phosphine oxide, 1 part by weight of a leveling agent, and 2 parts by weight of an adhesion promoter.

The photocurable resin composition according to Example 2 of the present disclosure includes a photocurable resin composition having the same weight as in Example 1, except that 100 parts by weight of 1,6-hexanediol diacrylate, 100 parts by weight of polyethylene glycol diacrylate, and 1 part by weight of an adhesion promoter are included.

The photocurable resin composition according to Example 3 of the present disclosure includes a photocurable resin composition having the same weight as in Example 1, except that 150 parts by weight of pentaerythritol triacrylate and 5 parts by weight of diphenyl(2,4,6-trimethylbenzoyl) phosphine oxide are included.

The photocurable resin composition according to Example 4 of the present disclosure includes a photocurable resin composition having the same weight as in Example 1, except that 20 parts by weight of 2-hydroxy-2-methyl-1-phenylpropan-1-one and 1 part by weight of an adhesion promoter are included.

The photocurable resin composition according to Example 5 of the present disclosure includes a photocurable resin composition having the same weight as in Example 1, except that a (meth)acrylic resin having a glass transition temperature of 52° C. and a molecular weight of 65,000 is used.

The photocurable resin composition according to Comparative Example 1 of the present disclosure includes a photocurable resin composition having the same weight as in Example 1, except that methylmethacrylate-butyl methacrylate copolymer is not included and 135 parts by weight of urethane acrylate is included.

The photocurable resin composition according to Comparative Example 2 of the present disclosure includes a photocurable resin composition having the same weight as in Example 1, except that urethane acrylate is not included and 155 parts by weight of 1,6-hexanediol diacrylate and 155 parts by weight of pentaerythritol triacrylate are included.

The photocurable resin composition according to Comparative Example 3 of the present disclosure includes a photocurable resin composition having the same weight as in Example 1, except that 1,6-hexanediol diacrylate, pentaerythritol triacrylate, and acryloylmorpholine are not included.

The photocurable resin composition according to Comparative Example 4 of the present disclosure includes a photocurable resin composition having the same weight as in Example 1, except that 120 parts by weight of 1,6-hexanediol diacrylate is included, and 2-hydroxy-2-methyl-1-phenylpropan-1-one and a leveling agent are not included.

(Experimental Example of Photocurable Resin Composition—Evaluation of Cured Film Properties)

The characteristics of a cured film prepared by curing the photocurable resin compositions of Examples 1 to 5 and Comparative Examples 1 to 4 were measured. The evaluation methods of the cured film have used evaluation methods listed in Table 3 below.

TABLE 3

| Evaluation items | Evaluation method | Target characteristic |
|---|---|---|
| Adhesive property | 1 mm × 1 mm × 100EA Cross-cut Nichiban Tape (JIS Z 1522) Forced peeling 3 times repetition | Good (100/100) |

TABLE 3-continued

| Evaluation items | Evaluation method | Target characteristic |
| --- | --- | --- |
| Adhesive property resistant to hot liquids | Adhesion test after standing at 100° C. in distilled water for 30 minutes | Good (100/100) |
| Adhesive property after UV over-curing | Adhesion test by further irradiation of 4,000 mJ/cm$^2$ after UV molding | Good (100/100) |
| QUV A (weatherability evaluation) | QUV A Adhesion test after 72 hours | Good (100/100) |
| Thermal shock (liquid nitrogen) | Curing (150° C., 30 min) after applying an epoxy-based background ink on an UV molding material. Being attached on a tempered glass, added to liquid nitrogen, and maintained for 3 minutes, and then standing left for 30 minutes at room temperature. Check whether or not cracks occurred in the UV molded material with an optical microscope. | No crack |
| High temperature and high humidity (50/95) | Adhesion test after standing for 72 hours in a 50° C./95% high temperature and high humidity apparatus | Good (100/100) |
| High temperature and high humidity (85/85) | Adhesion test after standing for 72 hours in a 85° C./85% high temperature and high humidity apparatus | Good (100/100) |

The results evaluated by the evaluation method described in Table 3 were shown in Table 4 below

TABLE 4

| | Property evaluation items | | | | | |
| --- | --- | --- | --- | --- | --- | --- |
| | Adhesive property (PET) | Adhesive property resistant to hot liquids (PET) | Adhesive property after UV over-curing (PET) | QUV A (72 hrs) | Thermal shock (liquid nitrogen) | High temperature and high humidity (50/95) | High temperature and high humidity (85/85) |
| Example 1 | 100/100 | 100/100 | 100/100 | 100/100 | No crack | 100/100 | 100/100 |
| Example 2 | 100/100 | 100/100 | 100/100 | 100/100 | No crack | 100/100 | 100/100 |
| Example 3 | 100/100 | 100/100 | 100/100 | 100/100 | No crack | 100/100 | 100/100 |
| Example 4 | 100/100 | 100/100 | 100/100 | 100/100 | No crack | 100/100 | 100/100 |
| Example 5 | 100/100 | 100/100 | 100/100 | 100/100 | No crack | 100/100 | 100/100 |
| Comparative Example 1 | 100/100 | 45/100 | 40/100 | 72/100 | Crack | 30/100 | 0/100 |
| Comparative Example 2 | 80/100 | 65/100 | 62/100 | 54/100 | No crack | 45/100 | 45/100 |
| Comparative Example 3 | 100/100 | 100/100 | 35/100 | 31/100 | Crack | 45/100 | 40/100 |
| Comparative Example 4 | 20/100 | 0/100 | 0/100 | 0/100 | Crack | 0/100 | 0/100 |

Referring to Table 4, it could be seen that the cured film formed of the photocurable resin composition of Examples 1 to 5 of the present disclosure was excellent in adhesive property, weatherability, or the like, and did not occur defects even under conditions of UV over-curing, thermal shock, and high temperature and high humidity. From this results, it could be seen that the photocurable resin composition according to an embodiment of the present disclosure includes a (meth)acrylic resin, a urethane acrylate oligomer, a photopolymerizable monomer ((meth)acrylic monomer), and a polymerization initiator, which have the above-mentioned composition, and may form a photocurable molding layer having excellent properties.

It may be seen that the photocurable resin composition of Comparative Example 1 does not include a (meth)acrylic resin, and thus defects occur under conditions of UV over-curing, thermal shock, and high temperature and high humidity.

It may be seen that the photocurable resin composition of Comparative Example 2 includes a (meth)acrylic resin, and thus defects caused by thermal shock do not occur, but a urethane acrylate oligomer is not included therein, so that the adhesive property and weatherability thereof are deteriorated, and defects occur under UV over-curing and high temperature and high humidity.

It may be seen that the photocurable resin composition of Comparative Example 3 includes 230 parts by weight of a photopolymerizable monomer ((meth)acrylic monomer) based on 100 parts by weight of the (meth)acrylic resin, so that the viscosity and crosslinking density of the composition are not controlled to deteriorate the adhesive property and weatherability thereof and to occur defects under conditions of UV over-curing, thermal shock, and high temperature and high humidity.

It may be seen that the photocurable resin composition of Comparative Example 4 includes a (meth)acrylic resin, a urethane acrylate oligomer and a photopolymerizable monomer ((meth)acrylic monomer) to be similar to the composition in Examples, but the photopolymerization initiator is included in a small weight ratio, and the leveling agent is not included, thus deteriorating the adhesive property and weatherability thereof and occurring defects under conditions of UV over-curing, thermal shock, and high temperature and high humidity.

Figure 7A:
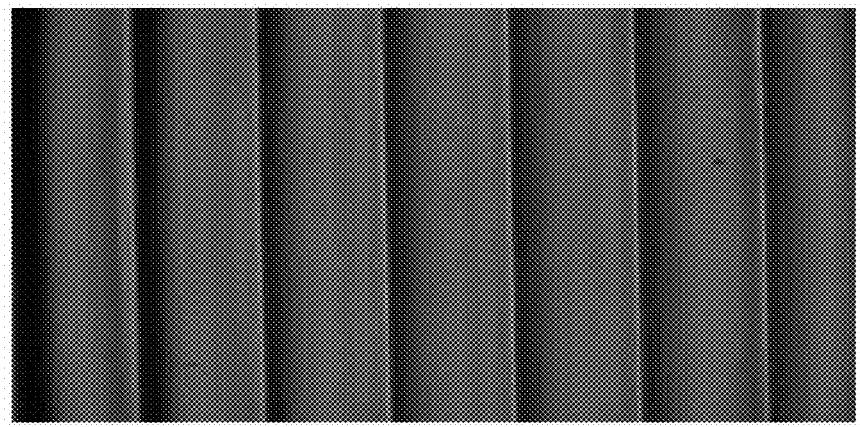
FIG. 7A is a photograph of a result of evaluating whether or not a crack occurs in a cured molding layer prepared with a photocurable resin composition according to an embodiment of the present disclosure.
Figure 7B:
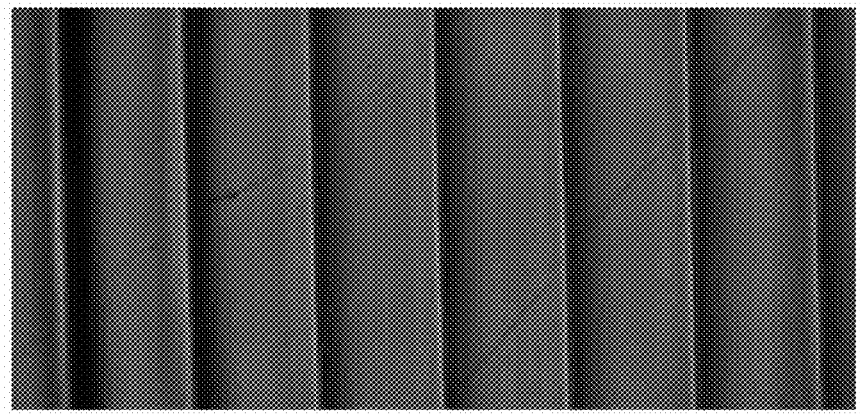
FIG. 7B is a photograph of a result of evaluating whether or not a crack occurs in a cured molding layer provided with a photocurable resin composition according to comparative examples.

FIG. 7A is a photograph of the results of evaluating whether or not cracks occur in the cured molding layer prepared by the photocurable resin composition according to an embodiment of the present disclosure. FIG. 7B is a photograph of the results of evaluating whether or not cracks occur in the cured molding layer prepared by the photocurable resin composition according to Comparative Examples.

FIG. 7B is a photograph of the results of evaluating whether or not cracks occur in the cured molding layer prepared by the photocurable resin composition not including a (meth)acrylic resin. Referring to FIGS. 7A and 7B, it may be seen that the cured molding layer prepared with the photocurable resin composition according to an embodiment of the present disclosure (FIG. 7A) has a reduced defect in which cracks are generated, as compared with Comparative Examples (FIG. 7B).

The photocurable resin composition according to an embodiment of the present disclosure is based on a photocurable resin composition including a urethane acrylate oligomer and a photopolymerizable monomer, and the (meth)acrylic resin, which is a non-curable resin, is mixed therewith to control the physical properties. Accordingly, the cured molding layer formed of the photocurable resin composition according to an embodiment of the present disclosure has excellent adhesive property and weatherability and increase the resistance to conditions of UV over-curing, thermal shock, and high temperature and high humidity, so that the occurrence of defects may be reduced. Therefore, when the molding layer of the window member is formed of the photocurable resin composition according to an embodiment of the present disclosure, there may be provided a window member for a display device which is subjected to additional ultraviolet irradiation in a subsequent process such as formation of an adhesive layer or rework, or which does not cause defects such as peeling even when exposed to an environment such as high temperature and high humidity and thermal shock.

A photocurable resin composition of the present disclosure may form a pattern layer which improves weatherability and adhesive property and does not decreases in physical properties such as decrease of adhesion even under the additional ultraviolet irradiation conditions, high temperature and high humidity conditions, and thermal shock conditions.

A fabrication method of a window member of the present disclosure may provide an ultraviolet curable resin pattern layer for improving weatherability, adhesive property and the like, so that the design characteristics and reliability of the product may be improved and excellent stability and yield ratio may be secured in the reworking.

Although the exemplary embodiments have been described, it is understood that the inventive concept should not be limited to these exemplary embodiments but various changes and modifications can be made by one ordinary skilled in the art within the spirit and scope of the inventive concept as hereinafter claimed. Therefore, the technical scope of the inventive concept should not be limited to the contents described in the detailed description of the specification, but should be defined by the claims.

What is claimed is:

1. A photocurable resin composition, comprising:
    based on 100 parts by weight of a (meth)acrylic resin,
    about 35 parts by weight of a urethane acrylate oligomer;
    about 500 to about 560 parts by weight of a photopolymerizable monomer, wherein the photopolymerizable monomer comprises a monofunctional (meth)acrylic monomer, a bifunctional (meth)acrylic monomer, and a polyfunctional (meth)acrylic monomer mixed in a weight ratio of about 1: about 0.5 to about 1.5: about 0.2 to about 1; and
    about 30 to about 35 parts by weight of a photopolymerization initiator.

2. The photocurable resin composition of claim 1, wherein the (meth)acrylic resin has a weight average molecular weight of about 10,000 to about 70,000, and has a glass transition temperature of about 50° C. to about 90° C.

3. The photocurable resin composition of claim 1, wherein the photopolymerizable monomer comprises at least one selected from the group consisting of isobornyl acrylate (IBOA), tetrahydrofuryl acrylate, tetrahydrofurfuryl acrylate, acryloyl morpholine, 2-phenoxyethyl acrylate, tripropyleneglycol diacrylate, polyethyleneglycol diacrylate, 1,6-hexane diol diacrylate, trimethylolpropane triacrylate, pentaerythritol triacrylate, or dipentaerytritol hexaacrylate.

* * * * *